United States Patent [19]

Sutera

[11] Patent Number: 5,405,526
[45] Date of Patent: Apr. 11, 1995

[54] BOTTLE WATER DISINFECTANT SYSTEM

[76] Inventor: Carl M. Sutera, 35 Dunham Rd., Billerca, Mass. 01821

[21] Appl. No.: 128,599

[22] Filed: Sep. 29, 1993

Related U.S. Application Data

[63] Continuation-in-part of Ser. No. 780,880, Oct. 18, 1991, which is a continuation of Ser. No. 541,775, Jun. 21, 1990, Pat. No. 5,114,042.

[51] Int. Cl.$^6$ .................................................. C02F 1/76
[52] U.S. Cl. .................................. 210/124; 210/202; 210/206; 210/259; 210/266; 210/469; 210/474; 210/475
[58] Field of Search ............ 210/472, 266, 282, 416.3, 210/466, 469, 475, 206, 202, 764, 473, 474, 476, 477, 124, 259; 222/146.6, 190, 146.1; 62/389, 391, 397

[56] References Cited

U.S. PATENT DOCUMENTS

| | | | |
|---|---|---|---|
| 2,061,119 | 11/1936 | Voigt | 210/474 |
| 2,167,225 | 7/1939 | Van Eweyk | 210/282 |
| 2,335,458 | 11/1943 | Senyal | 210/474 |
| 2,372,340 | 3/1945 | Senyal | 210/474 |
| 2,761,831 | 9/1956 | Robb et al. | 210/282 |
| 3,536,197 | 10/1970 | Ward | 210/282 |
| 3,692,180 | 9/1972 | La Raus | 210/188 |
| 3,726,404 | 4/1973 | Troglione | 210/192 |
| 3,772,189 | 11/1973 | Kreusch et al. | 210/694 |
| 4,024,991 | 5/1977 | Tyson et al. | 210/474 |
| 4,094,779 | 6/1978 | Behrman | 210/474 |
| 4,145,291 | 3/1979 | Console et al. | 210/474 |
| 4,176,169 | 11/1979 | Mysels | 423/501 |
| 4,181,243 | 1/1980 | Frahm | 210/282 |
| 4,312,754 | 1/1982 | LaFontaine | 210/282 |
| 4,322,291 | 3/1982 | Ho | 250/438 |
| 4,419,235 | 12/1983 | Sway | 210/282 |
| 4,505,727 | 3/1985 | Cullen et al. | 210/282 |
| 4,528,095 | 7/1985 | Byrne | 210/474 |
| 4,749,481 | 6/1988 | Wheatley | 210/282 |
| 4,757,921 | 7/1988 | Snowball | 222/190 |
| 4,923,091 | 5/1990 | Sutera | 222/146.6 |
| 4,946,599 | 8/1990 | Craig | 210/741 |
| 4,995,975 | 2/1991 | Jacquot et al. | 210/266 |
| 5,076,922 | 12/1991 | DeAre | 210/474 |
| 5,106,495 | 4/1992 | Hughes | 210/192 |
| 5,114,042 | 5/1992 | Sutera | 222/185 |
| 5,116,502 | 5/1992 | Ferguson | 210/453 |
| 5,126,044 | 6/1992 | Magnusson et al. | 210/282 |
| 5,139,666 | 8/1992 | Charbonneau et al. | 210/264 |
| 5,173,192 | 12/1992 | Shalev | 210/767 |
| 5,176,836 | 1/1993 | Sauer et al. | 210/670 |
| 5,200,070 | 4/1993 | McMenamin | 210/282 |
| 5,240,620 | 8/1993 | Shalev | 210/474 |
| 5,269,919 | 12/1993 | von Medlin | 210/266 |
| 5,308,482 | 5/1994 | Mead | 210/207 |

Primary Examiner—Cynthia L. Nessler
Attorney, Agent, or Firm—Joseph T. Regard, Ltd.

[57] ABSTRACT

A bottle water disinfectant, storage, and dispensing system for purifying drinking water or the like. The preferred embodiment of the present invention contemplates a bottle water dispensing system having an inlet line, a storage tank, a filter area, and a dispensing port, wherein there is provided the steps of infusing water flowing into the storage tank with a disinfecting medium such as iodine, chlorine or the like, allowing the infused water to remain in the storage tank for a period of time to allow the disinfecting medium present in the stored water to kill all microbes and the like in the water, and selectively dispensing the stored water, including the further steps of filtering the disinfectant medium and remaining contaminants from the stored water. The present invention is taught for use in conjunction with a bottle water system having a wide neck, as such an arrangement allows for the non-pressurized, gravity flow of the stored water having the disinfection agent through filtration system placed in conjunction with the wide neck. Such an embodiment would be beneficial for use in Third World Countries or the like, wherein pressurized water is unavailable, and wherein water could be dumped directly into an inlet area via buckets or the like.

7 Claims, 11 Drawing Sheets

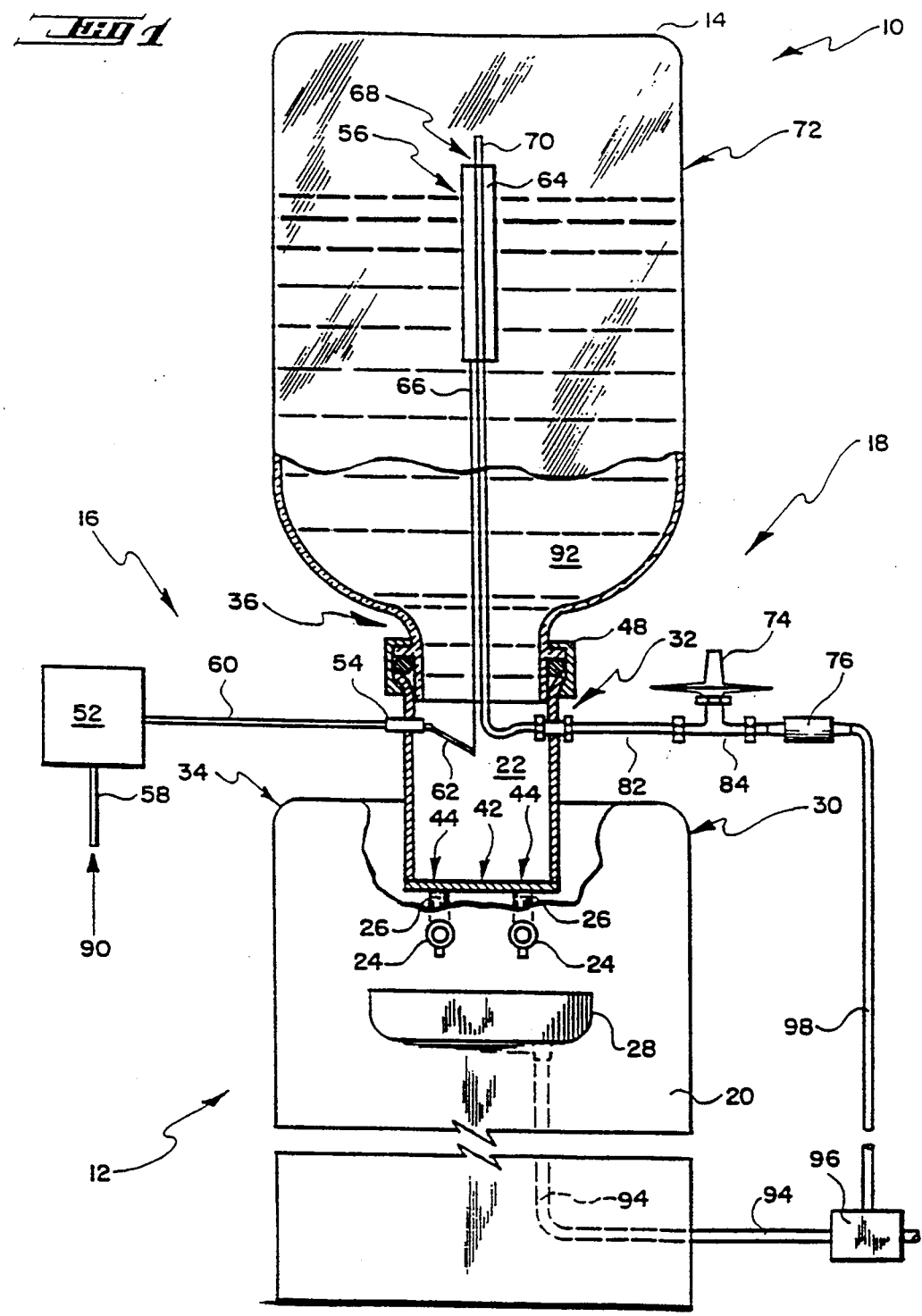

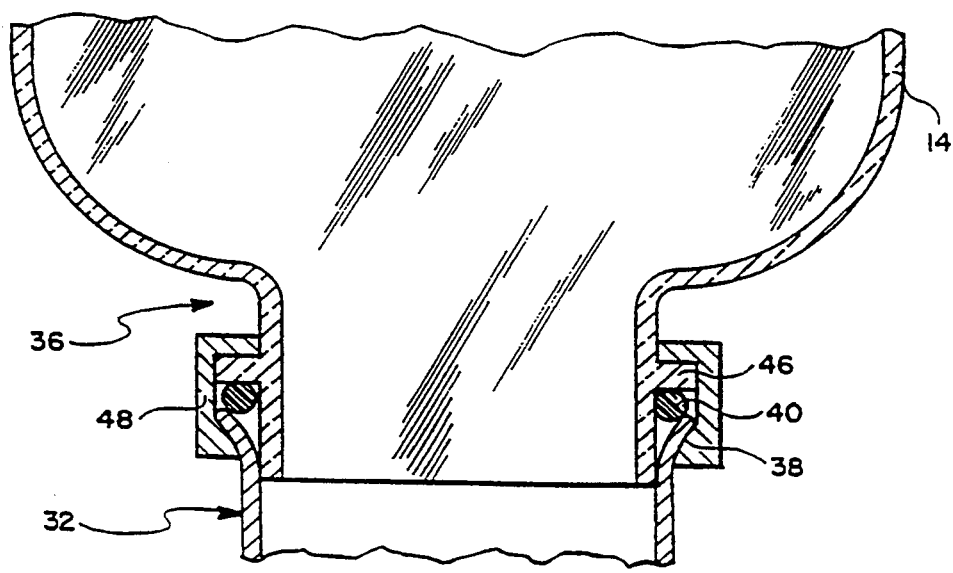
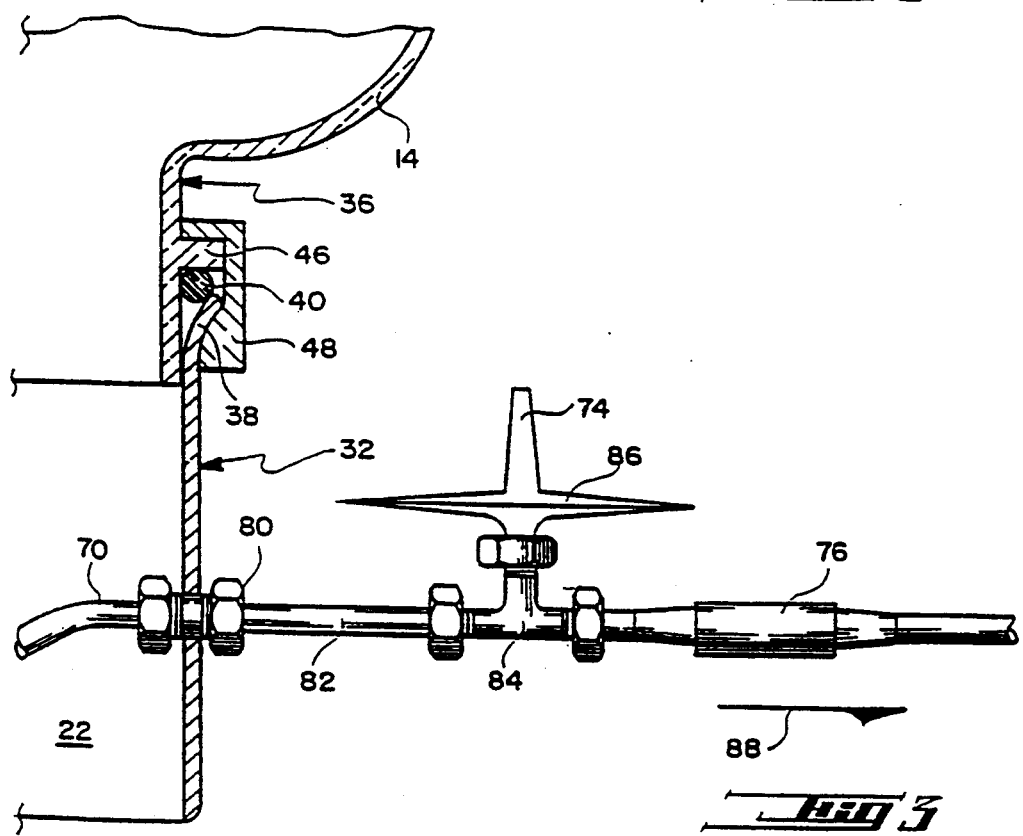

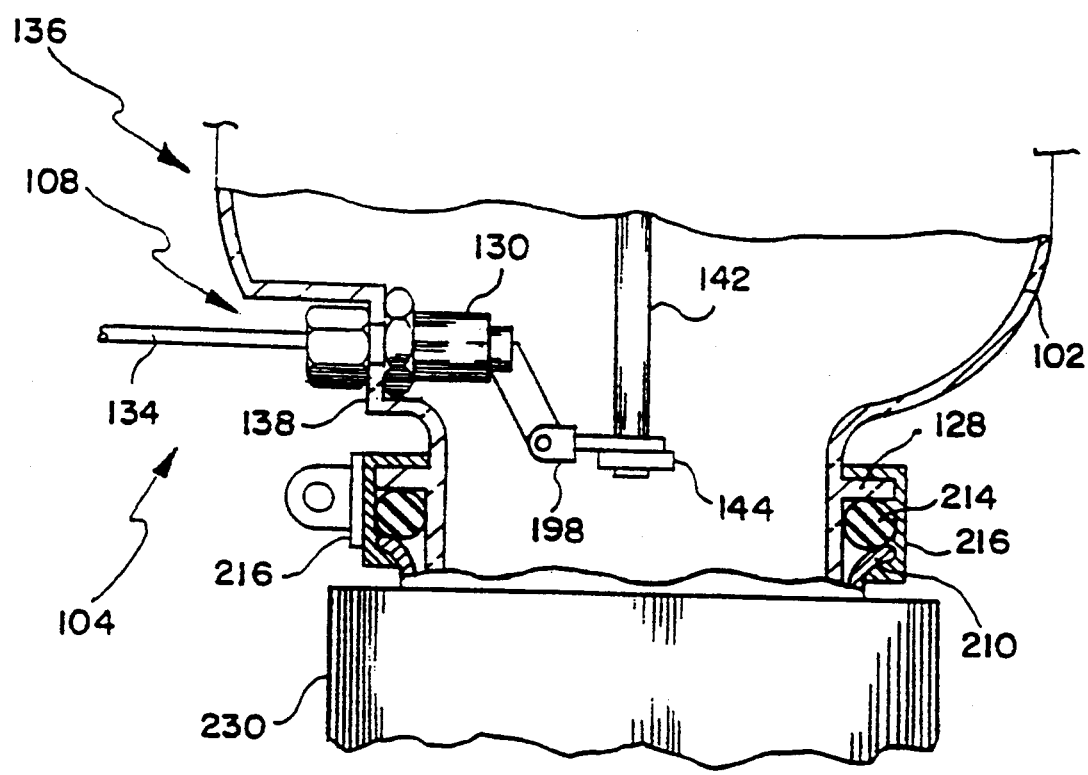
_FIG 5

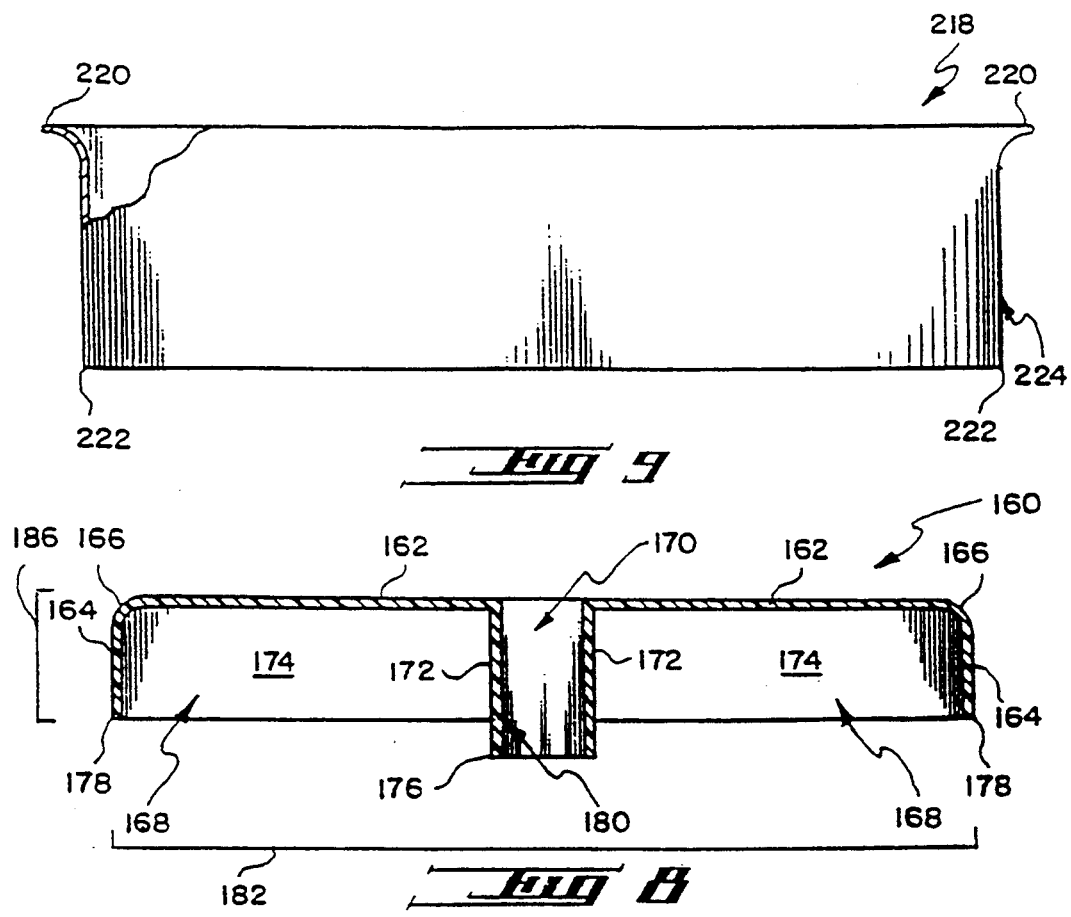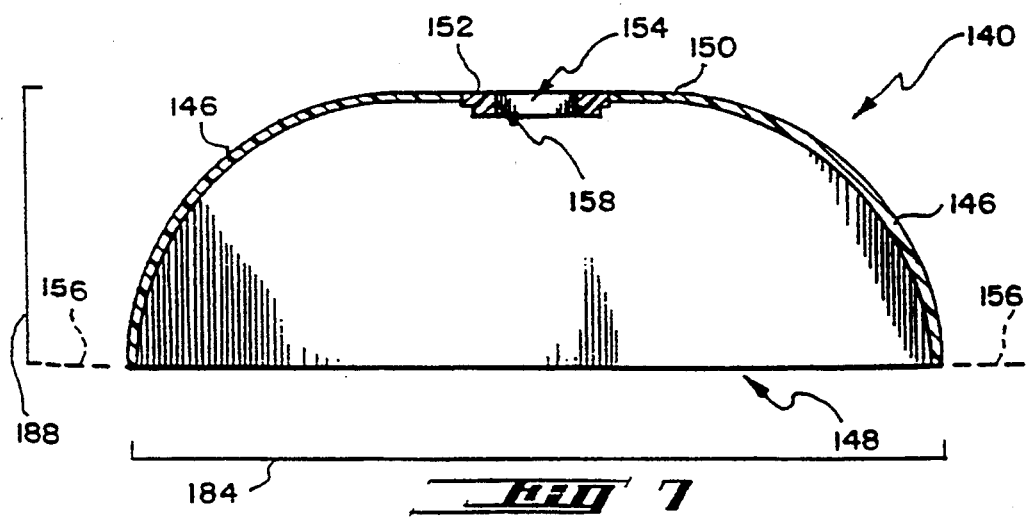

BOTTLE WATER DISINFECTANT SYSTEM

The present invention is a continuation-in-part of U.S. patent application Ser. No. 07/780,880, filed Oct. 18, 1991, by Carl M. Sutera, entitled "Self-Filling Bottled-Water Cooler Conversion Kit", which is a continuation of U.S. patent application Ser. No. 07/541,775, filed Jun. 21, 1990, now U.S. Pat. No. 5,114,042, issued May 19, 1992 to Carl M. Sutera, entitled "Self-Filling Bottled-Water Cooler Conversion Kit".

BACKGROUND of the INVENTION

1. Invention Field

The present invention relates to systems for treating and dispensing liquids, and in particular to a bottle water disinfectant, storage, and dispensing system for purifying drinking water or the like.

The preferred embodiment of the present invention contemplates a bottle water dispensing system having an inlet line, a storage tank, a filter area, and a dispensing port, wherein there is provided the steps of infusing water flowing into the storage tank with a disinfecting medium such as iodine, chlorine or the like, allowing the infused water to remain in the storage tank for a period of time to allow the disinfecting medium present in the stored water to kill all microbes and the like in the water, and selectively dispensing the stored water, including the further steps of filtering the disinfectant medium and other contaminants from the stored water.

The present invention is taught for use in conjunction with a bottle water system having a wide neck, such as that contemplated in patent application Ser. No. 07/780,880 to applicant for a "Self-Filling Bottle Water Cooler Conversion Kit", as such an arrangement allows for the non-pressurized, gravity flow of the stored water having the disinfection agent through filtration system placed in conjunction with the wide neck. Such an embodiment would be beneficial for use in Third World Countries or the like, wherein pressurized water is unavailable, and wherein water could be dumped directly into an inlet area via buckets or the like.

2. General Background Discussion

While there exists a multitude of portable water purification systems, most have proven impractical, due to practicalities such as cost, durability, maintainability, and effectiveness. It is for this reason that the Third World, and even remote areas of industrialized countries, still lack in large part safe drinking water. Notwithstanding advances in the capabilities of liquid decontamination/filtration systems of various military and space filtration/decontamination systems, basic, thorough, and cheap water disinfectant still has eluded most of the world.

A listing of patents which may be of some interest regarding the present invention are cited below:

| Patent Number | Inventor(s) | Date of Issue |
| --- | --- | --- |
| 5,200,070 | McMenamin | Apr 06, 1993 |
| 5,176,836 | Sauer et al | Jan 05, 1993 |
| 5,126,044 | Magnusson et al | Jun 30, 1992 |
| 4,995,975 | Jacquot et al | Feb 26, 1991 |
| 4,176,169 | Mysels | Nov 27, 1979 |
| 3,772,189 | Kreusch et al | Nov 13, 1973 |

Pat. No. 5,200,070 teaches a "Bottle Water Filter Arrangement" wherein there is provided a water cooler having a bottle member, and a filter member provided in conjunction with the base. The alternative embodiment of the '070 invention teaches a "flotation container" between the lower end of the bottle, and the upper floor of the filter member, said flotation container arranged to "impart additives into the water as desired".

The '070 patent teaches as exemplary additives to be placed in the flotation container "nutrients such as vitamins ... coloration, flavoring, and the like ... ". Unlike the present, applied for invention, '070 does not contemplate the portioning of a disinfectant medium into the stored water in the bottle, to be thereafter filtered prior to dispensing.

Pat. No. 5,176,836, issued 1993 for a "Regenerable Biocide Delivery Unit" teaches a system for "long term Microbial Control" in a water supply in closed systems for space applications, including "deep space missions" and the like. This invention teaches the introduction of molecular iodine into the water supply for decontamination purposes, the invention further teaching the removal of the iodine from the water by flowing same through an iodinated anion exchange resin bed.

Pat. No. 5,126,044 issued 1992 for an "Iodine Resin/Carbon Water Purification System" teaches a water filtration system wherein there is provided a water treatment apparatus having an iodine resin purification bed supported in a walled structure and mounted upstream of an active carbon filtration bed. An alternative embodiment of the invention contemplates utilization of the system for providing purified water to a canteen, wherein there is provided a collection bottle, and the filter of the present embodiment between the collection bottle and canteen. The patent (col 6, line 67) indicates that, in this embodiment, "purification and filtration are achievable via a gravity flow of the water through the cartridge ... " (referring to FIG. 6).

Pat. No. 4,995,975 issued 1991 teaches a "Unitary Water Cooler Filter" for "filtering and purifying tap water in combination with a conventional water cooler and bottle", wherein there is provided "[a] silver-impregnated activated carbon filter medium, capable of removing chlorine and absorbable organic chemicals from potable water, positioned on the upper surface of the lower retaining element ... " (abstract).

Pat. No. 3,772,189 teaches "a method of treating water utilizing activated carbon which has been made bacteriostatic by the homogeneous absorption of iodine", with reversible absorption of the iodine by the carbon.

Pat. No. 4,181,243 teaches a "device for filtering beverages" for use in conjunction with a "wine barrel", water cooler or the like, wherein there is provided a filter (20) incorporated into the spigot inlet port, for filtering particulates from the beverage as it is being dispensed.

As may be discerned by a review of the above, the prior art has yet to contemplate an inexpensive, yet effective system for filtering and disinfecting water or the like, wherein there is provided not only the means to disperse and antibacterial agent such as iodine or the like into the water, but also the means to store said water in a tank for a period of time prior to filtering the agent from the water and dispensing the water, in order to provide a more effective disinfection system, necessitating less agent than conventional flow through systems.

SUMMARY DISCUSSION OF THE INVENTION

Unlike the prior art, the present invention provides a water disinfection system which is comparatively effective and reliable, while being relatively inexpensive to maintain, and easy to operate.

The preferred embodiment of the present invention contemplates an iodine/iodide, or other bactericide material infusion means for infusing fluid prior/during entry into the water bottle; the water bottle provides a storage factor, for allowing exposure by the iodine/iodide to the water (and any microbes therein) for a period of time, as opposed to conventional iodide exposure/filtration in-line disinfection systems, such as that contemplated in Pat. No. 5,126,044 supra, wherein the iodine/iodide is diffused into the water then immediately filtered therefrom. It is believed that such a system may not fully disinfect all bacteria in the water supply, as the iodine is only in the water for a very short period of time.

The present invention is configured for use in conjunction with a bottle water dispenser system whereby the water may be provided via tap directly to the bottle, by an exterior source such as a bucket pouring the water into a collection area, which flows into the bottle, via filter and iodine infusion unit.

A main component in the present invention is the neck filter, for filtering the iodide/iodine and foreign matter from the water during the dispensing operation. The neck filter feature of the present invention is enhanced due to the large mouth of the exemplary bottle, subject of Pat. No. 5,114,042 issued May 19, 1992 to the inventor, entitled "Self-Filling Bottled Water Cooler Conversion Kit" and incorporated herein in its entirety by reference.

Since the water flows through the neck filter via gravity, a very large surface area is necessary for obtaining a reasonable flow rate of water through the filter, for dispensing purposes. The preferred embodiment of the present invention utilizes the large mouth of the '042 patent, coupled with preferred dual coupling system for providing a watertight seal on the water bottle/dispenser section, as will be shown infra.

It is an object of the present invention to provide a water bottle purification/filtration system which is versatile in application, and able to be utilized in conjunction with municipal water sources, wells, as well as carried water poured therein and gravity fed.

It is still another object of the present invention to provide a system for purifying and filtering water which is easily implemented, relatively inexpensive to maintain and effective in its disinfection.

It is another object of the present invention to provide a system for purifying and filtering water wherein said water is infused with a disinfectant or bactericide medium, such as iodine or the like, the step of holding said infused water for a period of time, and removing said iodide and filtering out contaminants concurrent with dispensing the water.

Lastly it is an object of the present invention to provide an improvement for existing water bottle dispensers, allowing them to purify and filter the contents therein.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a partial cross-section view of a self-filling bottled water cooler according to the present invention;

FIG. 2 is a cross-section view of the self-filling bottled water cooler of FIG. 1 showing attachment of the bottle to the upper section of the water tank;

FIG. 3 is a partial cross-sectional view of the self-filling bottled water cooler of FIG. 1 showing a portion of the venting system;

FIG. 5 is a partial cross-section view of the apparatus of FIG. 4 showing a portion of the water inlet system;

FIG. 7 is a cross-section view of the umbrella float of the apparatus of FIG. 4;

FIG. 8 is a cross-section view of the umbrella float of the apparatus of FIG. 4;

FIG. 9 is a plan view of an adapter which can be used in conjunction with the apparatus of FIG. 4;

DETAILED DESCRIPTION OF THE PREFERRED EMBODIMENTS

Figure 4:
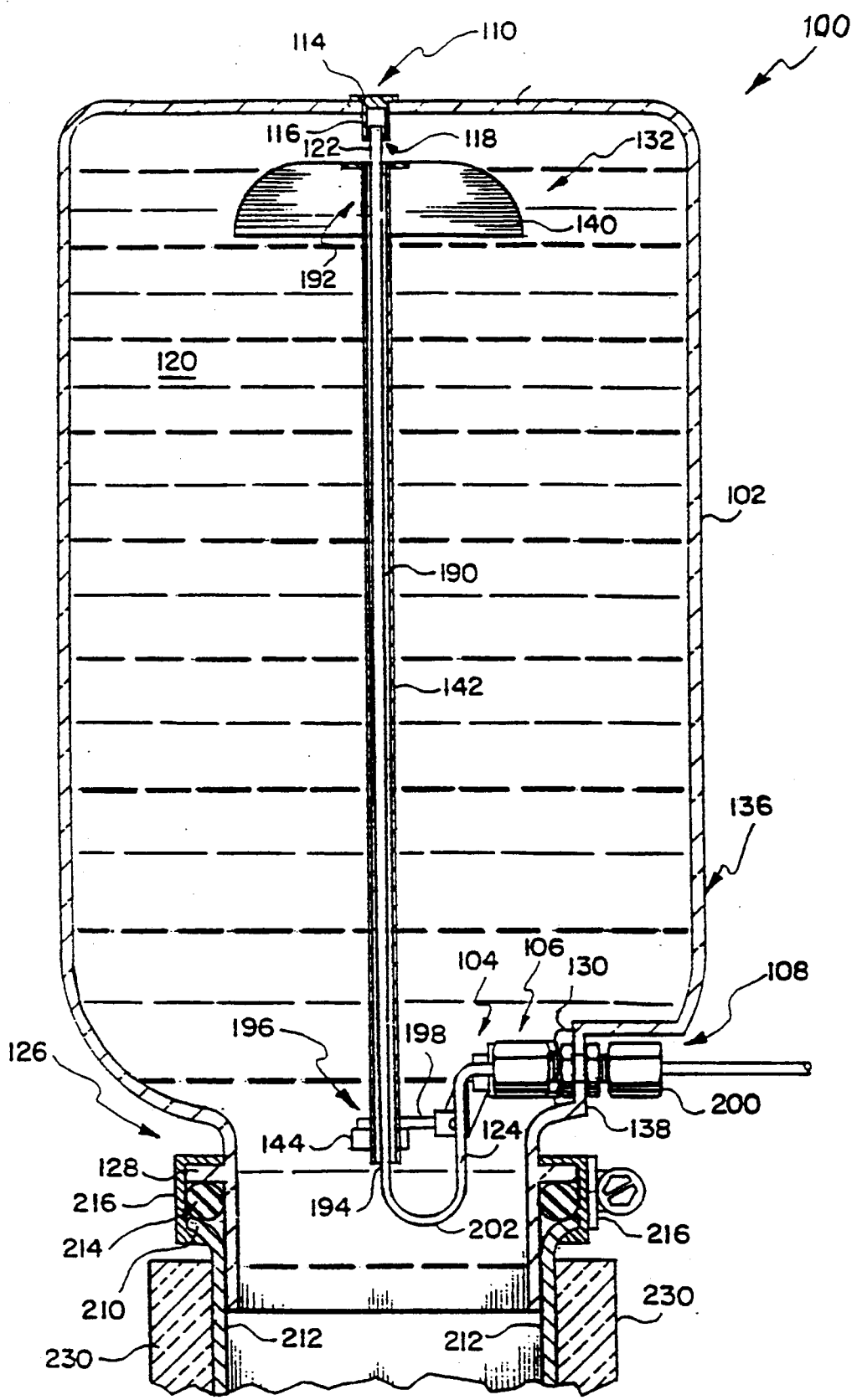
FIG. 4 is a cross-section view of an apparatus for converting a conventional bottled-water cooler into a self-filling bottled-water cooler according to the present invention.

Referring now to the drawings, wherein like reference numerals designate corresponding or similar elements throughout the several views, an exemplary self-filling bottled-water cooler 10 according to the present invention as depicted in FIG. 1. The self-filling bottled-water cooler 10 includes a dispensing system 12, a water bottle 14, a water inlet system 16 and a venting system 18.

The dispensing system 12 includes a free-standing cabinet body 20, a water tank 22 located in the upper portion 30 of the cabinet body, at least one tap 24 mounted on the front of the cabinet body 20 and plumbing connections 26 from the water tank 22 to the taps 24 to permit water to flow from the water tank through the taps when the taps are opened. The dispensing system can also include a heating and/or cooling system (not shown) to vary the temperature of water dispensed through the taps. For example, a heating system can be included so that one tap dispenses hot water for coffee, tea 12, or soup, and a cooling system can be included so that another tap dispenses cold water for cold drinks.

Such heating and cooling systems are known in the industry and therefore are not described here.

The cabinet body 20 can also include a spill tray 28 mounted under the taps 24 to catch water spilled from the taps. Such spill trays are also known in the industry. A spill drain line 94 can be included in the cabinet body to drain spilled water from the spill tray 28 to a drain pump 96.

The cabinet body 20 is self-standing and must be configured to stably support the water bottle 14 filled with water. The cabinet body can be formed of sheet metal, plastic or other rigid materials.

The water tank 22 is located within the upper portion 30 of the cabinet body 20 such that an upper section 32 of the water tank extends upward beyond the top surface 34 of the cabinet body to mate with the neck 36 of the water bottle 14. Alternatively, the water tank 22 can be located completely within the upper portion 30 of the cabinet body 20 such that the neck 36 of the water bottle 14 projects downward into the upper portion 30 of the cabinet body to mate with the upper section 32 of the water tank. The water tank 22 can be made of stainless steel or any other sturdy material non-reactive with water and has a circular horizontal cross section. The upper edge 38 of the water tank is flared to accommodate an O-ring seal 40. The bottom surface 42 of the tank has at least one outlet 44 to allow water in the tank to flow through the plumbing connections 26 to the taps 24 for dispensing.

The water bottle 14 can be made of glass, plastic or any other transparent rigid material and is securely attached in an inverted position to the upper section 32 of the water tank of the cabinet body 20. As can best be seen in FIG. 2, the water bottle 14 is formed with a straight neck 36 having an annular flange 46. The outside diameter of the straight neck 36 is selected to be slightly smaller than the inside diameter of the upper section 32 of the water tank such that its neck 36 snugly slides into the inside of the upper section 32 of the water tank 22. As can be seen in the figure, the flared upper edge 38 of the water tank cooperates with the annular flange 46 formed on the neck of the water bottle and an O-ring seal 40 placed between the flared upper edge 38 and the annular flange 46 to seal the joint between the bottle 14 and the water tank 22. Clamps 48 engage the annular flange 46 and the flared upper edge 38 to secure the bottle onto the water tank 22 and to provide additional pressure on the O-ring seal 40 to seal the joint.

The water inlet system 16, which supplies purified water to the interior of the water bottle, includes water inlet lines 58 and 60, a reverse osmosis, carbon block or other water purifier 52, an inlet valve 54 and a float mechanism 56. A first water inlet line 58 connects to a tap-water or other continuous water source (not shown) to supply water 90 to the water purifier 52, which purifies the water. The water purifier 52 can purify the water to greater than 99% purity, which is greater than the purity of bottled water supplied for conventional bottled water coolers. A second water inlet line 60 connects the water purifier 52 to the inlet valve 54 to supply purified water to the water tank 22 of the dispensing system 12. The inlet valve 54 is mounted on the water tank 22 and regulates the flow of purified water into the water tank. The inlet valve 54 is biased in an open position to normally allow the purified water to enter the water tank 22. A lever 62 on the inlet valve 54 moves upward in a vertical arc to close the valve to control the flow of purified water into the water tank 22.

The float mechanism 56 includes a tubular float 64 and a thin wire, filament or other linkage 66. The float 64 is made of polycarbonate and has an axial hole 68 through its center. The float 64 is slidably disposed on an overflow tube 70 which extends vertically in the bottle 14 from the water tank 22 to the upper portion 72 of the bottle. The overflow tube 70 passes through the axial hole 68 in the float such that the float 64 is free to slide vertically on the tube 70. The wire, filament or other linkage 66 connects the float to the lever 62 of the inlet valve 54 to control the position of the lever and therefore to regulate the valve.

The venting system 18 includes the overflow tube 70, an air vent 74 having a hydrophobic bacteria filter, a check valve 76, a drain pump 96 and drain line plumbing 80, 82, 84, and 98. The overflow tube 70 is made of plastic, stainless steel or any other rigid material non-reactive with water and is rigidly attached to the water tank 22 by conventional plumbing fixtures 80 which that the overflow tube 70 provides a passage from the upper portion 72 of the water bottle, down through the bottle 14 and out through the water tank 22. As can be seen in FIG. 3, a drain line 82 and a "T" fixture 84 connect the overflow tube 70 at the plumbing fixtures 80 on the water tank 22 to the air vent 74 and check valve 76. A drain line 98 connects the check valve 76 to the drain pump 96. The drain pump 96 pumps spilled water collected by the spill tray 28 and overflow water collected by the venting system to a drain destination.

The air vent 74 includes a hydrophobic bacteria filter in a housing 86 to prevent bacteria and other contaminants from entering the water supply through the air vent. Typically, a 0.22 microfilter is used. The check valve 76 only permits fluid flow in the direction of the arrow 88 and therefore also prevents contaminants from backflowing through the venting system into the water supply.

The venting system 18 acts as an emergency overflow drain to prevent the water bottle 14 from overfilling. The venting system 18 also provides an air vent to the upper portion 72 of the water bottle above the water level in the bottle. Venting of the bottle above the water level is necessary to prevent a change in air pressure within the bottle when water is added to the bottle or dispensed through the taps 24. Without venting of the bottle, air pressure would build in the bottle as water is added to the bottle until the pressure is great enough to prevent additional water from entering the bottle. Therefore, without venting, the bottle would never fill. Conversely, without venting of the bottle, air pressure would drop in the bottle as water was dispensed through the taps 24 until the drop was great enough to prohibit flow of water through the taps. Therefore, without venting, the flow of water through the taps would be inhibited.

As can be seen from the figures, water 90 enters the first inlet line 58 of the cooler and is purified in the water purifier 52. The purified water 92 passes through the second inlet line 60 and the inlet valve 54 and fills the water tank 22 and the water bottle 14 until the water 92 in the bottle reaches the desired full level, raises the float 64 and closes the inlet valve 54. As the water 92 fills the water bottle 14, air exits the bottle through the venting system 18 to keep the air pressure in the bottle constant. The water level then remains constant until a user dispenses water from the cooler.

When a tap 24 is opened, water is dispensed from the water bottle 14 and the water tank 22 through the tap. This causes the water level in the bottle to drop which in turn causes the float 64 to lower and therefore to open the inlet valve 54 once again to allow more purified water 92 to enter the water tank 22 and water bottle 14 to restore the water level in the bottle to its original place. As the water level in the bottle drops, air enters the bottle through the venting system 18 to keep the air pressure in the bottle constant.

If the inlet valve 54 malfunctions by remaining in the open position and the water level within the bottle rises above the normal full level of the bottle, purified water 92 flows into the overflow tube 70 and passes out of the cooler without causing water pressure to build in the bottle.

The teachings of the present invention can also be used to convert existing conventional bottled-water coolers into self-filling bottled-water coolers. In an alternative embodiment of the present invention, most shown in FIGS. 4, 5 and 6, an apparatus 100 for converting a conventional bottled-water cooler into a self-filling bottled-water cooler is provided. The conversion apparatus 100 includes a water bottle 102 similar to the water bottle 14 described above. Onto the water bottle 102, are mounted a water inlet system 104 and a venting system 106, similar to the water inlet system 16 and venting system 18 which in the embodiment of FIG. 1 are mounted onto the water tank 22 of the cabinet body 20. The conversion apparatus 100 easily converts a conventional bottled-water cooler into a self-filling bottled-water cooler by replacing the interchangeable bottle of the conventional bottled-water cooler with the conversion apparatus 100, as described below.

The water bottle 102 is essentially the same as water bottle 14 described above except that a cutout 108 is provided in the water bottle for mounting the water inlet system 104 and the venting system 106. The area of the water bottle around the cutout 108 can be opaque and a dark color, such as black, to mask connection of the water inlet system 104 and the venting system 106 to the water bottle 102. Also, in a small hole in the center 110 through the top wall 112 of the water bottle is mounted a small plug 114 having a tubular portion 116 with an open end 118 13 extending into the interior 120 of the water bottle 102 for receiving the upper end 122 of the overflow tube 124, as will be described in more detail below.

Like water bottle 14 described above, water bottle 102 is formed with a straight neck 126 having an annular flange 128. The outside diameter of the straight neck 126 is selected to be slightly smaller than the inside diameter of the water tank 212 of the bottled-water cooler to be converted such that the neck 126 will snugly slide into the inside of the water tank 212.

The water inlet system 104 includes an inlet valve 130 and a float mechanism 132. The inlet valve 130, which best can be seen in FIG. 5, is fluidically connected by a water inlet line 134 to a water purifier (not shown in FIG. 5, but such as water purifier 52 of the embodiment of FIG. 1) and ultimately to a tap-water or other continuous water source (not shown in FIG. 5, but as shown and described for the embodiment of FIG. 1). The inlet valve 130 is mounted on the bottom portion 136 of the water bottle through flat surface 138 in cutout 108. The inlet valve 130 regulates the flow of purified water into the water bottle and operates in a similar manner to the inlet valve 54 described above.

The float mechanism 132, which best can be seen in FIG. 4, includes an umbrella float 140, a tubular support 142 and a catch 144. As can best be seen in FIG. 7, the umbrella float 140 is made of a rigid, airtight plastic or other suitable material nonreactive with water and has a curved semi-spherical body 146 with an open bottom end 148. Typically, the umbrella float body 141 is made of a transparent material so that it is nearly invisible when used within the water bottle 102. Through the top wall 150 of the float body 146, a support plug 152 is located which has an axial hole 154 perpendicular to the plane, represented by dashed line 156, of the open bottom end 148 of the float body 146. As further described below, the axial hole 154 provides the attachment point for the umbrella float 140 to the tubular support 142. The support plug 152 is thicker than the top wall 150 of the umbrella float body 146 and must provide a sufficiently sized inside surface 158 for firm attachment of the umbrella float 140 to the tubular support 142. Typically, the support plug 152 will be made of the same transparent material as the umbrella float body 146, but can be made of any rigid, airtight plastic or other suitable material non-reactive with water and capable of being bonded to the float body 146. The axial hole 154 in the support plug 152 must be of sufficient diameter to provide a snug fit around the outside of the cross section of the tubular support 142.

In an alternative embodiment, the umbrella float 140 can be configured as shown in FIG. 8. As shown in the figure, the alternative embodiment 160 of the umbrella float is flatter than the umbrella float 140 of FIG. 7 and generally has a disc shape. The alternative embodiment umbrella float 160 is made of the same rigid materials as the umbrella float 140 of FIG. 7 and also typically is transparent. The alternative embodiment umbrella float 160 has a flat upper wall 162 integrally formed with a short, ring-shaped outer sidewall 164. A rounded edge 166 joins the upper wall 162 with the outer sidewall 164. As with the umbrella float of FIG. 7, the bottom 168 of the alternative embodiment umbrella float 160 is open.

An axial hole 170 having a tubular sidewall 172 extends downward from the upper wall 162 through the inside 174 of the alternative embodiment umbrella float 160. The tubular sidewall 172 of the axial hole 170 is integrally formed with the upper wall 162 of the float and the bottom edge 176 of the tubular sidewall 172 extends below the bottom edge 178 of the outer sidewall 164 of the float. As with the umbrella float of FIG. 7, the axial hole 170 is used to attach the alternative embodiment umbrella float 160 to the tubular support 142. Thus, the inside diameter of the axial hole 170 must be of sufficient size to snugly fit over the outside cross section of the tubular support 142. Also, the length of the tubular sidewall 172 must provide a sufficiently sized inside surface 180 for firm attachment of the alternative embodiment umbrella float 160 to the tubular support 142.

Typically, the overall diameter 182 of the alternative embodiment umbrella float 160 is greater than the overall diameter 184 of the umbrella float 140 of FIG. 7; however, the height 186 of the outer sidewall 164 of the alternative embodiment umbrella float 160 is significantly less than the overall height 188 of the umbrella float 140 of FIG. 7. Thus, an advantage of the alternative embodiment umbrella float 160 over the umbrella float 140 of FIG. 7 is that the lower height 186 of the outer sidewall of the alternative embodiment umbrella float 160 coupled with its larger overall diameter 182 gives the alternative embodiment umbrella float 160 the same buoyancy as the umbrella float 140 of FIG. 7, yet because of the lower profile of the alternative embodiment umbrella float 160, it is less noticeable in the top of the water bottle 102. Also, because the tubular sidewalls 176 of the axial hole 170 of the alternative embodiment umbrella float 160 extend downward below the bottom edge 178 of the outer sidewall 164 when the alternative embodiment umbrella float 160 is used, an airtight chamber is integrally formed in the inside 174 of the float without any need to provide an airtight seal between the outside of the tubular support 142 and the inside surface 180 of the axial hole.

As best can be seen in FIG. 4, the tubular support 142 is disposed around the upstanding portion 194 of the overflow tube 124. The tubular support 142 supports the umbrella float 140 within the water bottle 102, provides a bearing surface 190 for the umbrella float 140 to ride upon in a vertical path within the water bottle 102, and links the umbrella float 140 to the inlet valve 130. The tubular support 142 is made of a rigid plastic or other suitable material non-reactive with water. The tubular support 142 is formed into a thin tube and typically is transparent. The length of the tubular support is determined by placement of the catch 144 described below. The upper end 192 of the tubular support 144 firmly attaches to the inside surface 158 of the axial hole 154 of the umbrella float 140. A water-insoluble adhesive or other water-insoluble means is used to connect the upper end 192 of the tubular support 142 to the umbrella float 140. Unless the umbrella float 160 of FIG. 8 is used in the conversion apparatus, the seal between the outside surface of the upper end 192 of the tubular support 142 and the inside surface 158 of the axial hole 154 must be airtight.

As the inside surface of the tubular support 142 provides a bearing surface 190 for the umbrella float 140 to ride upon within the water bottle 102, the inside diameter of the tubular support 142 must be greater than the outside diameter of the overflow tube 124, described below, and must be of sufficient size so that the tubular support 142 can easily slide in a vertical direction along the upstanding portion 194 of the overflow tube 124.

To the bottom end 196 of the tubular support 142 is attached the catch 144. The catch 144 trips the lever 198 of the inlet valve 130 to stop the flow of water into the water bottle 102 when the level of water in the water bottle 102 reaches the desired full level and raises the umbrella float 140. The catch 144 is made of a ring of plastic or other suitable material press fit around the bottom end 196 of the tubular support 142. An insoluble adhesive can also be used to attach the catch 144 around the bottom end 144 of the tubular support 142. The catch 144 must be attached to the bottom end 196 of the tubular support 142 at a distance from the umbrella float 140 sufficient to trip the lever 198 of the inlet valve 130 and close the valve when the water in the water bottle 102 reaches the desired full level and raises the umbrella float 140.

The venting system 106 is essentially the same as the venting system 18 described above, except that the venting system 106 is mounted onto the bottom portion 136 of the water bottle 102 by conventional plumbing fixtures 200 which pass through flat 138 in cutout 108. The upstanding portion 194 of the overflow tube 124 must be straight and have sufficient length to allow the float mechanism 132 to vertically slide along the upstanding portion 194 and have enough movement in the vertical direction to close the inlet valve 130 when the water level in the water bottle 102 reaches the desired full level. Thus, in the conversion apparatus embodiment shown in FIG. 4, the bottom portion of the overflow tube 124 has a U-shaped portion 202 ta provide an upstanding portion 194 of sufficient length.

In the conversion apparatus shown in FIG. 4, the upper end 122 of the overflow tube 124 is held in the tubular portion 116 of the small plug 114 mounted in the center 110 of the top wall 112 of the water bottle 102. The tubular portion 116 of the small plug 114 provides support to the upper end 122 of the overflow tube 124. The tip of the upper end 122 overflow tube 122 merely rests within the tubular portion 116 of the small plug 114 and is not affixed within the tubular portion 116 in any manner. A clearance is provided between the outside surface of the tip of the upper end 122 of the overflow tube 124 and the inside surface of the tubular portion 116 of the small plug 114 so that air and, if water overfills the water bottle 102, water can freely flow between the inside 120 of the water bottle 102 and the inside of the overflow tube 124.

Figure 6:
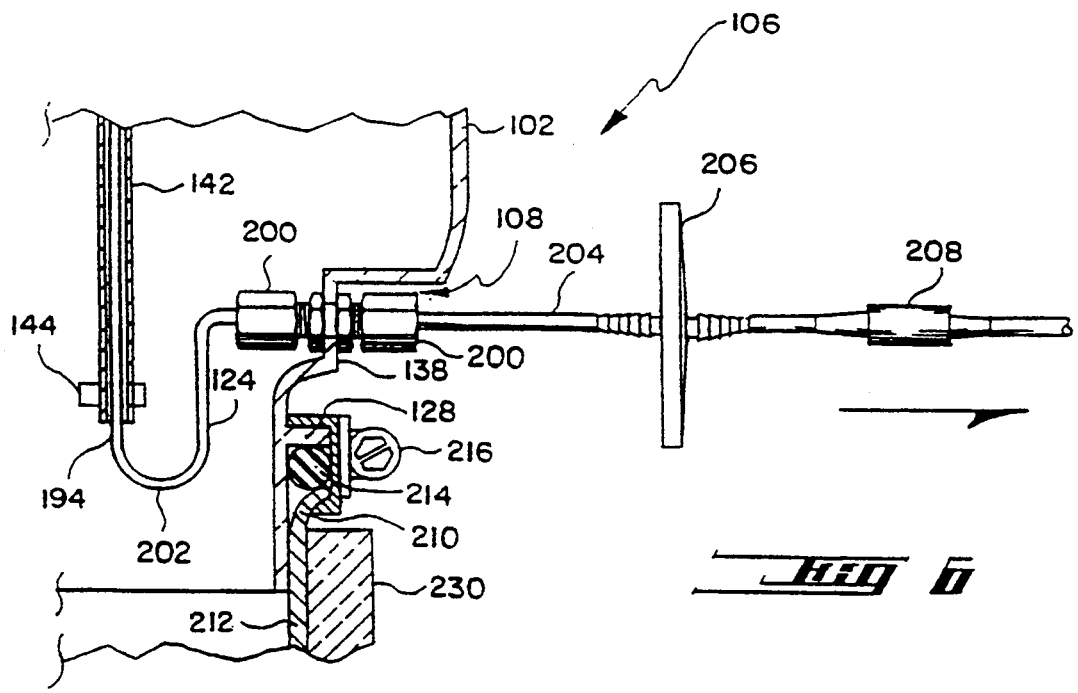
FIG. 6 is a partial cross-section view of the apparatus of FIG. 4 showing a portion of the venting system.

As can best be seen in FIG. 6, as in the venting system 18 of the embodiment of FIG. 1, the overflow tube 124 is connected through conventional plumbing fixtures 200 and drain line 204 to a bacteria filter 206, a check valve 208 and ultimately to a drain pump and a drain source (not shown). The bacteria filter 206 can be of a hydrophilic type as shown in FIG. 6, or of a hydrophobic type use with a "T" Fixture 84, housing 86 and air vent 74 as shown in FIG. 3. The function and operation of the venting system 106 in the conversion apparatus 100 embodiment is the same as the function and operation of the venting system 18 in the self-filling bottled-water cooler 10 embodiment of FIG. 1.

A conventional bottled-water cooler is converted to a self-filling bottled-water cooler with the conversion apparatus 100 by removing the interchangeable bottle of the conventional bottled-water cooler, removing the bottle seat from the top of the cooling-dispensing unit of the conventional bottled-water cooler to expose the top of the water tank of the cooler, and attaching the conversion apparatus 100 to the tank of the cooler.

The conversion apparatus 100 attaches to the tank of a conventional bottled-water cooler in the same manner as water bottle 14 attaches to upper section 32 of water tank 22 of the embodiment of FIG. 1. As can best be seen in FIG. 4, the flared upper edge 210 of water tank 212 of the conventional bottled-water cooler cooperates with the annular flange 128 formed on the neck 126 of the water bottle 102 and an O-ring seal 214 placed between the flared upper edge 210 and the annular flange 128 to seal the joint between the bottle 102 and the water tank 212. A worm-gear clamp 216 engages the annular flange 128 and the flared upper edge 210 to secure the bottle 102 onto the water tank 212 and to provide additional pressure on the O-ring seal 214 to seal the joint.

As some conventional bottled-water coolers do not have a water tank with a flared upper edge, an adapter such as the adapter 218 shown in FIG. 9, can be provided to facilitate attachment of the conversion apparatus 100 to the water tank of the conventional bottled-water cooler. Adapter 218 is ring shaped and made of plastic, stainless steel or any other suitable rigid material non-reactive with water. The upper edge 220 of the adapter 218 is flared to accommodate an O-ring seal.

The exact dimensions for a particular use will depend upon the particular dimensions and characteristics of the tank of the bottled-water cooler to be converted; however, for illustrative purposes, the adapter 218 shown in FIG. 9 has a height of two inches, an inside diameter, measured at the lower edge 222 of six and one-quarter inches, an outside diameter, measured from edge to edge of the flared upper edge 220, of six and five-eighths inches, a radius of one quarter inch for the flared portion of the upper edge 220 and a wall thickness of one sixty-fourth inch.

Figure 10:
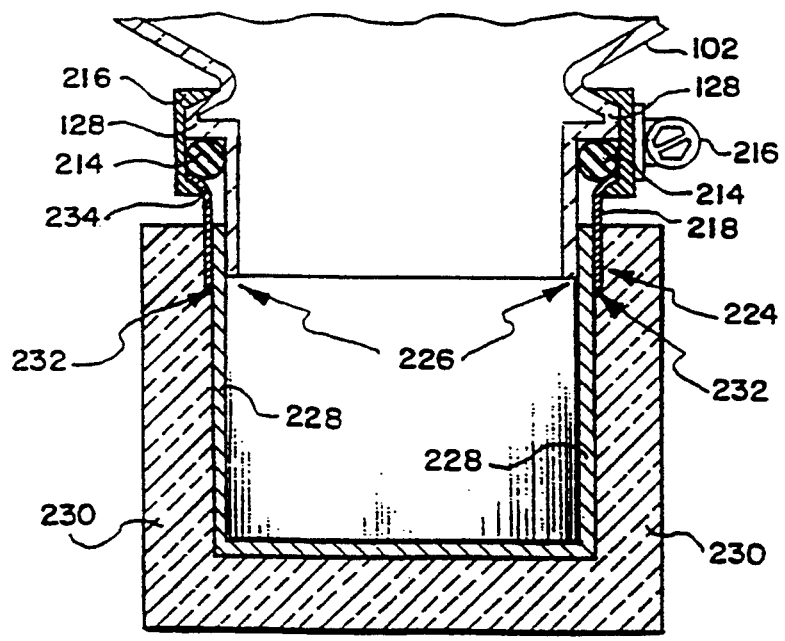
FIG. 10 is a cross-section view showing use of the adapter of FIG. 9 in conjunction with the apparatus of FIG. 4.

As shown in FIG. 10, the lower portion 224 of the adapter 218 is slipped over the outside of the upper section 226 of the water tank 228 of the bottled-water cooler to be converted between the upper section 226 and the foam insulation 230 surrounding the water tank. The inside diameter of the adapter 218 must be sufficient to provide a secure fit at the area 232 between the outside surface of the upper section 226 of the water tank 228 and the inside surface of the lower portion 224 of the adapter 218. A suitable water-insoluble adhesive can be used to securely fasten the lower portion 224 of the adapter 218 to the outside surface of the upper section 226 of the water tank 228 and to prevent water leakage. When attached to the water tank 228 as described immediately above, the adapter provides a flared upper edge 234 for mating with the O-ring seal 214 of the water bottle 102. Connection of the water bottle 102 to the adapter 218 and the upper section 226 of the water tank 228 is completed just as described above for a water tank having an upper section with a flared edge.

Once converted, a conventional bottled-water cooler converted to a self-filling bottled-water cooler with the conversion apparatus 100 functions in the same manner as described above for the self-filling bottled-water cooler 10 embodiment shown in FIG. 1.

Figure 11:
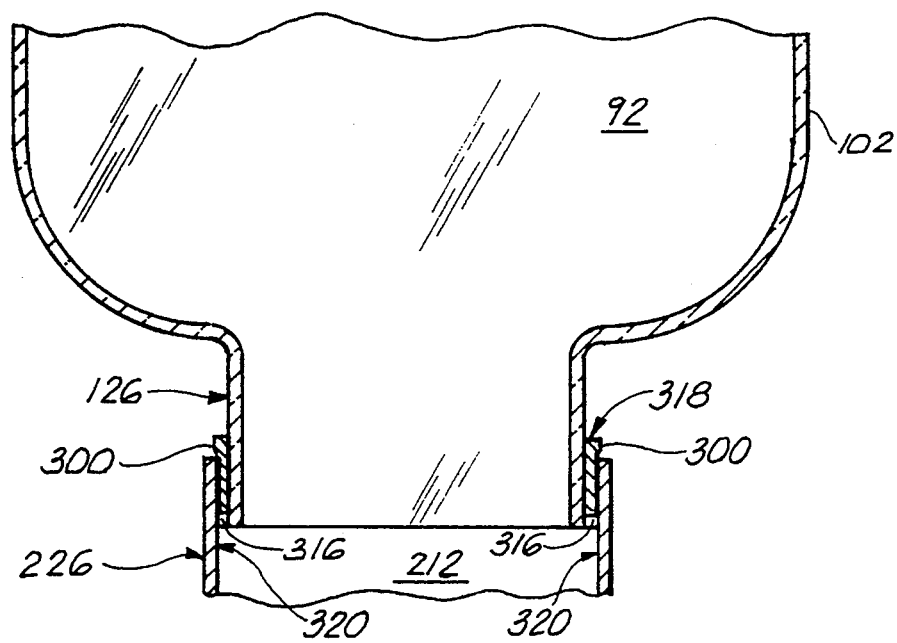
FIG. 11 is a partial cross-sectional view of the self-filling bottled-water cooler apparatus of FIG. 4, showing an alternative neck seal.

Referring now to FIG. 11, an alternative embodiment for mating the water bottle 102 with the upper section 226 of the water tank 212 is shown. The bottle 102 with a straight neck 126 is depicted with a flat seal 300 secured to the neck 126. As can be seen in the figure, the upper section 226 of the water tank 212 cooperates with the flat seal 300 to form a watertight joint between the bottle 102 and the water tank 212.

Figure 12:
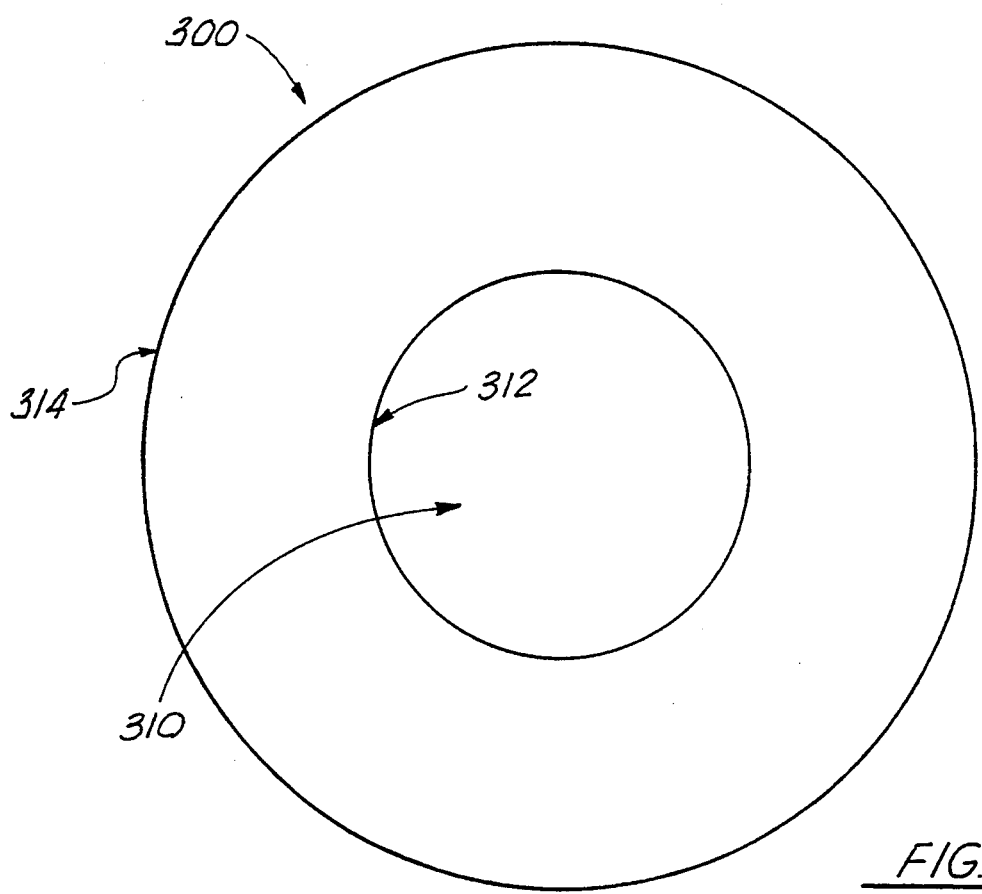
FIG. 12 is a plan view of the neck seal of FIG. 11.

The flat seal 300 performs the same function of forming a watertight seal, as that of the O-ring seal 214, flange 128, flared upper edge 210 and clamp 216, depicted in FIG. 4. The structural composition of the seal 300 is better understood with reference to FIG. 12. The seal 300 is a flexible elastomeric "pancake," or disk, having a central hole or opening 310. In the preferred embodiment, the seal 300 is made of silicone rubber. Both sides of the seal 300 are generally smooth.

The seal 300 is flat when not installed on the neck 126. To install the seal 300, the central opening 310 of the seal 300 is stretched over the neck 126 of the bottle 102, with the one side of the seal 300 pressed against the outer surface of the neck 126. Thus, when the seal 300 is installed, it becomes cylindrical and readily conforms to the size and shape of the neck 126. The elastic tension of the seal 300, combined with the surface friction between the generally smooth surface of the seal 300 and the neck 126 ensure that the seal remains secured to the neck. Because the inside circumference 312 of the seal 300, when flat before installation, is less than the outside circumference 314, when the seal 300 is stretched over the neck 126 of the bottle 102, the inside circumference 312 stretches more than the outside circumference 314. Thus, when the seal 300 is installed on the neck 126, because of such differential stretching, the thickness of the seal 300 near the mouth of the neck 126 at the lower edge 316, which corresponds to the inside circumference 312 of the seal, is less than the thickness of the seal 300 at the upper edge 318, which corresponds to the outside circumference 314 of the seal. Accordingly, this gives the seal, when installed, a tapered or wedge effect. Such a taper or wedge effect aids insertion of the neck 126 into the upper section 226 of the water tank 221 and compensates for imperfections in fit.

After the seal 300 is stretched over the neck 126 of the water bottle 102, the neck 126 with the seal 300 is firmly pressed inside the upper section 226 of the water tank 221. The elastic properties of the seal 300 also conform the seal to the size and shape of the inside surface 320 of the upper section 226 of the water tank 212. Such elastic properties combined with the friction between the generally smooth surface of the seal and the inside surface 320 of the water tank 212 ensure that the seal 300 firmly attaches the water bottle 102 to the water tank 212 without water leakage. Such an arrangement provides an uncomplicated, yet effective, watertight seal which uses only friction and the weight of the bottle 102 and water 92 to provide the necessary sealing forces. Thus, the expense and complication of use of a clamping or other fastening device, such as a worm-gear clamp 216, is avoided.

Figure 13:
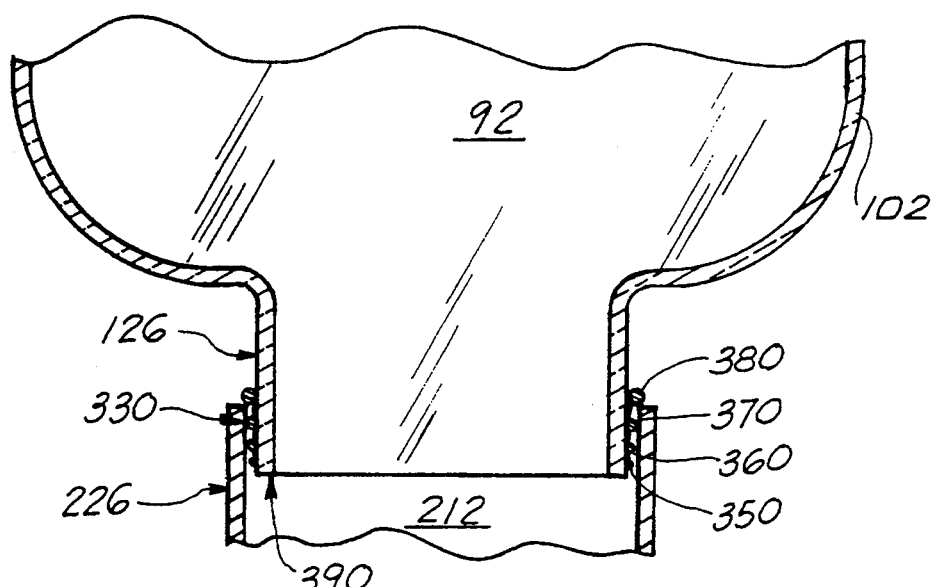
FIG. 13 is a partial cross-sectional view of an alternative embodiment of the neck seal of FIG. 11.
Figure 14:
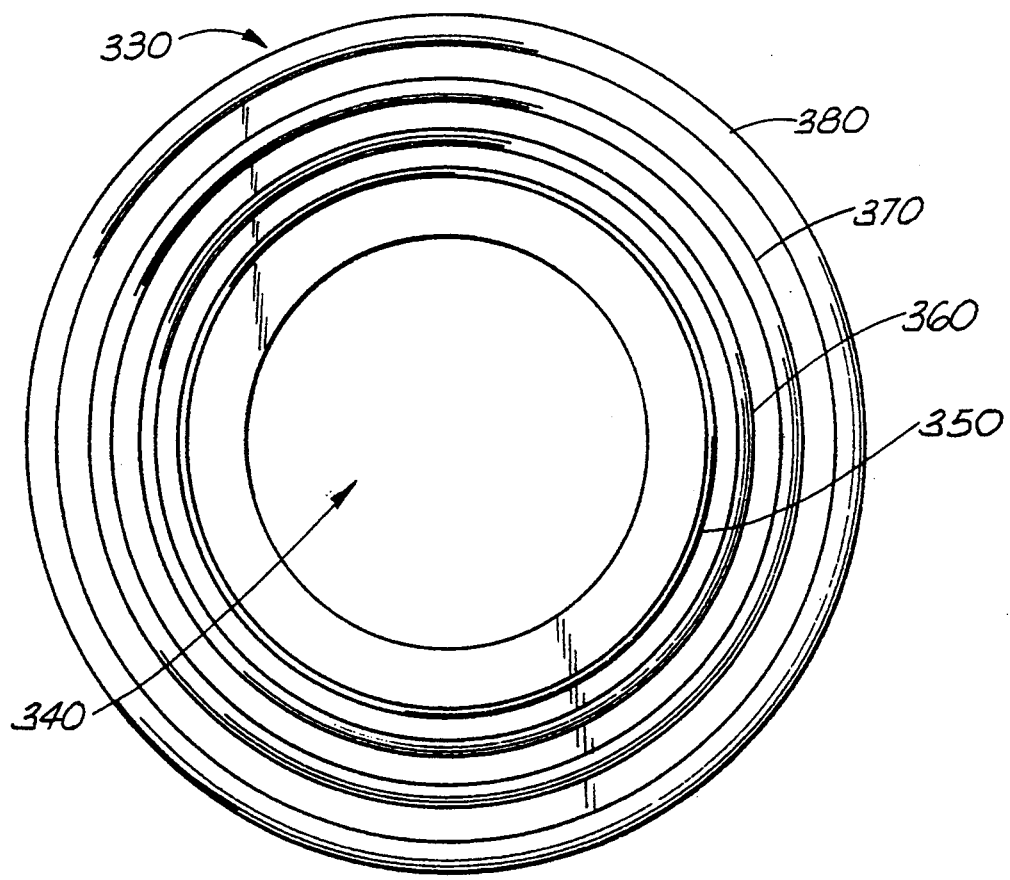
FIG. 14 is a plan view of the neck seal of FIG. 13.

An alternative embodiment of the seal 300 is shown in FIGS. 13 and 14. Referring particularly to FIG. 14, the alternative embodiment is shown as a ribbed seal 330, also formed from an elastomeric "pancake" or disk having a central hole or opening 340. Unlike the flat seal 300, the ribbed seal 330 has rounded ridges 350t 360, 370, 380 disposed concentrically on one side of the seal 330, around the hole 340. Proceeding outward from the hole 340, each successive ridge is wider and thicker. The outermost ridge 380 is the largest. The opposite side of the seal 330 is generally smooth. Like the flat seal 300, in the preferred embodiment, the ribbed seal 330 is made of silicone rubber.

Installation of the ribbed seal 330 is performed in the same manner as the installation of the flat seal 300 described above. As with the flat seal 300, the generally smooth side of the ribbed seal 330 is pressed against the outer surface of the neck 126.

When the ribbed seal 330 is installed, the outermost ridge 380, which is the widest and thickest of the ridges, is uppermost located on the neck 126 of the water bottle 102. Thus, the successively narrower and thinner ridges 370, 360 and 350 are successively located lower on the neck 126 and closer to the edge 390 of the neck. This arrangement of the ridges 350, 360, 370, 380 allows the ridges to wipe the inside surface 320 of the upper section 226 of the water tank 212 and gives the seal 330 an increased taper or wedge effect when the seal is properly installed on the neck 126.

The use and operation of the ribbed seal 330 are similar to the use and operation of the flat seal 300 described above.

Figure 15:
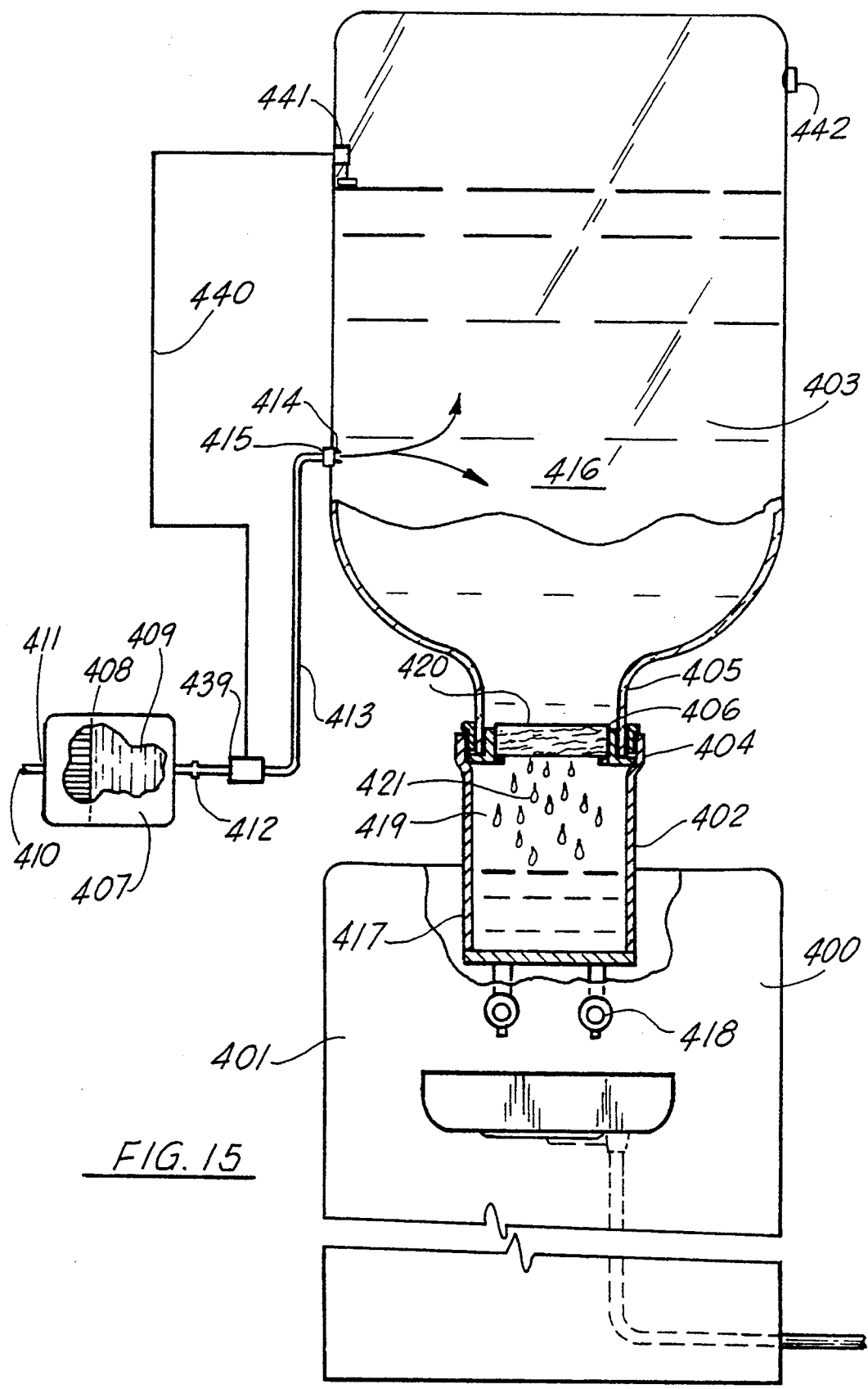
FIG. 15 is a frontal, partially cut-away view of the bottled water disinfectant system of the present invention.

FIG. 15 illustrates the disinfection system of the present invention, wherein there is provided the ability to cheaply and reliably kill bacteria, germs, virus and the like present in a water supply, without the harmful side effects of some chemical disinfection systems.

As illustrated, the disinfection embodiment of the invention 400 includes a cabinet body 401 wherein there is provided on top thereof a water tank 402. As shown, an inverted water bottle 403 rests atop the upper section 404 of water tank 402, with the neck 405 of the bottle mounted to the tank 402 within the upper, inner wall area of the tank, and is held in sealingly communication therewith via seal 406. Note that the neck of the water bottle is much larger than that of most off-the-shelf water bottles, said neck having an outer diameter only slightly less than the inner diameter of the water tank.

The preferred embodiment of the present invention may utilize an ordinary tap or other source of water, there being provided a water line 410 or the like, which is interfaced by a filtration/bactericide unit 407 for treating the water prior to reaching the tank 403.

As shown, the bactericide unit 407 has a housing having a first, inlet end 411, and a second outlet end 412. Water fed into the inlet passes first through a particulate/sediment and carbon filter (which may be activated carbon), which removes chlorine, chemicals, and the debris from the water. Another substance which may work well in leiu of carbon could be KDF, a metallic reduction material which reduces oxidizing materials. It is noted that it is important that the chlorine be removed from the water prior to passing through the iodine infusion area, as chlorine will cause excess or inconsistent iodine infusion into the water, decreasing efficiency of the system.

The system may also include a flow limiting arrangement, such as a reduced diameter orifice following the sediment filter, in order to allow for sufficient contact time regarding the iodine infusion area and the water passing therethrough.

Next, the water passes through an iodine/iodide 409 infusion media, infusing into the water iodine molecules for disinfection purposes. An exemplary iodine infusion media would be the MCV resin manufactured by MCV Technologies International of Belleville, Ill.

The filtered/iodine infused water then exits the housing via outlet 412, and is fed to bottle 403 via line 413, which enters 414 tank, in fluid impermeable fashion, via gasket 415. The present invention may also include a float valve or the like such as disclosed supra for maintaining a desired level of fluid in the bottle. Or, it may rely upon, for example, a float switch 441 arrangement, which controls a solenoid valve 439 via control wire 40. Also, a vent 442 in the form of a diaphragm valve or the like may be provided as needed above the water level of the valve.

Unlike conventional iodine adding devices, which quickly add and remove the iodine, like 3,772,189 supra, the present invention allows the iodine infused water 416 to rest in the bottle for a period of time, the iodine not being removed until the time at which the water is actually dispensed. This not only greatly enhances the efficiency of the system, but also prevents the formation of algae or the like in the bottle.

In use, the infused water 416 passes via gravity or hydrostatic pressure through filter 420, which may be of silver impregnated carbon (preferably activated) or the like, configured to remove iodine, TLC's, and lead. The filter may have a polyproplyne housing with a polyfilament mesh to retain and hold the media.

Upon passing through filter 420, the water 421 is made potable, having had removed therefrom the iodine and other contaminants. The potable water 417 is now held in the water tank 402, until it is dispensed therefrom via dispensing valve 418. As long as a void 419 exists in the water tank 402, water will continue to feed through filter 420; but when the water tank is full, the filter will permeate with water and will cease flow, until a void is again created in the tank via dispensing of the contents of same.

Figure 16:
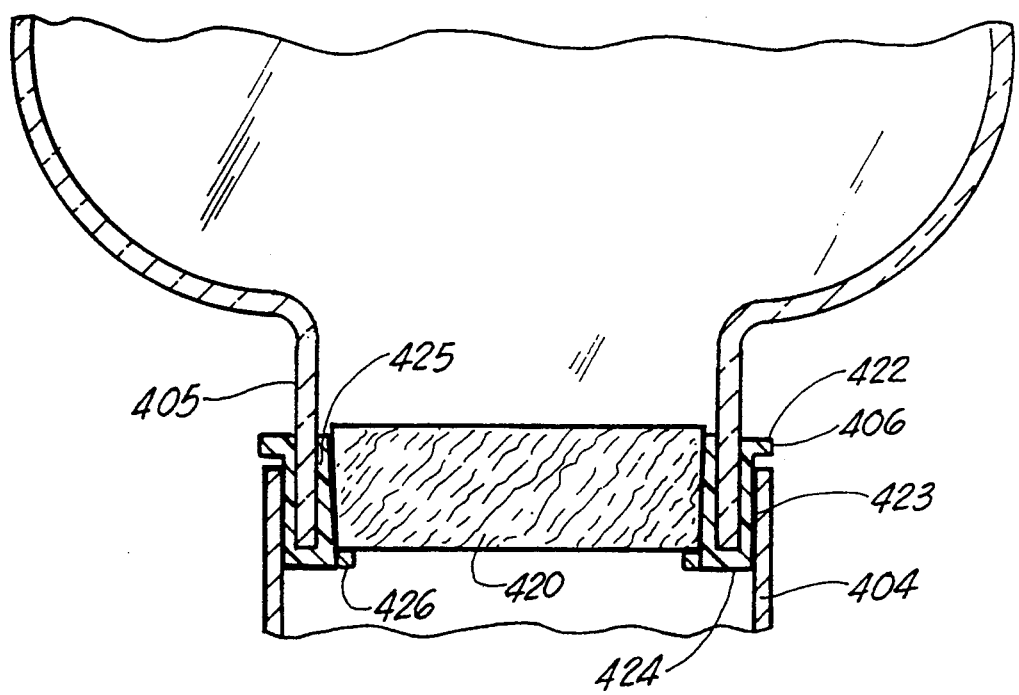
FIG. 16 is a close-up, cross-sectional view of the bottled water disinfectant system of FIG. 15.

A main component in the present system is the neck filter 420, including a housing and filter material, as shown more clearly in FIG. 16. Satisfactory performance in the present gravity fed system is due to the large mouth of the present bottle neck 405. Since the water flows through the neck filter by gravity only, a very large surface area (such as, in this case, about 18 square inches) is required to achieve a reasonable flow rate of water through the filter.

Since the neck filter is replaceable, a sealing mechanism must be utilized between the filter and the inside neck surface of the bottle. This inside seal 425 is accomplished via the present seal, which may hold the filter in place via ring 426 about the base thereof, resulting in a fluid impermeable seal between the housing of the filter and the inner wall of the bottle neck. The seal of the present invention may be configured of silicone or KRATON, or any fluid impermeable, inert, elastomeric material, and is in effect two seals, the seal 423 on the outer side of the bottle neck to attach and seal a bottle to a dispenser, and the seal 425 between the neck filter outer surface and the bottle neck inner surface, to attach and seal the neck filter to the inside of the bottle neck. The exemplary seal as illustrated includes a portion 424 under the neck of the bottle, connecting the inside 425 and outer side seal 423. The present invention may also incorporate the features of the various alternative seals as illustrated and addressed in the discussion of FIGS. 11-14, supra.

Referring back to FIG. 16, the bottle may be held frictionally in place upon the upper portion of the water tank, or may be held via lip 422 extending over the top of the water tank 404, in conjunction with the wrap around feature of the present seal, which wraps around the outer wall of the neck, end, and inner wall of the neck. Likewise, the filter 420 may be held in place via frictional communication with the inner seal 425, or may rely upon a lip 426 extending about the inner diameter of the lower portion 424 of the seal intersecting the inner 425 and outer 423 seal areas.

Figure 17:
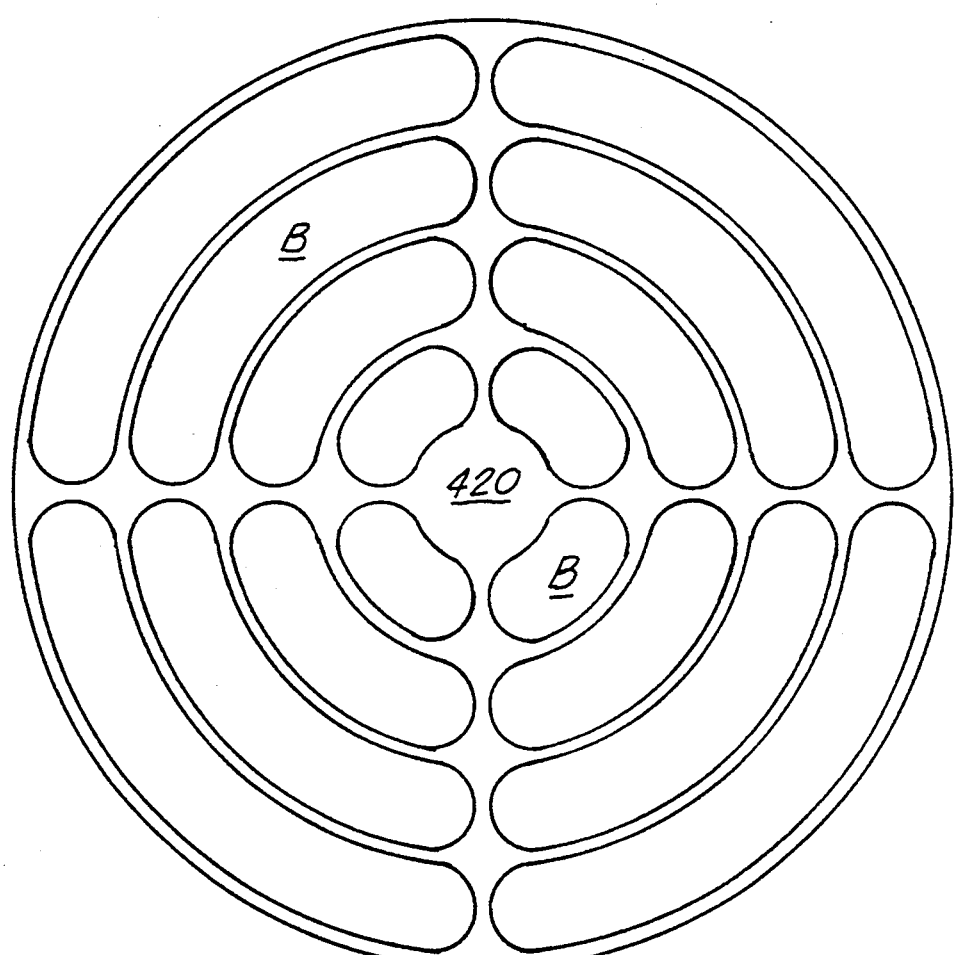
FIG. 17 is a top view of the neck filter of the invention of FIG. 16.

As shown in FIG. 17, the neck filter 420 may have a series of axial (in the direction of flow) baffles B, which are necessary to achieve effective filtration. The function of these baffles is to create a length to width ratio of at least 2 to 1, while maintaining even filtration throughout the filter. This 2 to 1 ratio has been empirically determined by testing as being effective by testing several other neck filter configurations.

An exemplary cross section of the neck filter of the present invention is illustrated in FIG. 17, showing an exemplary 17.5 in$^2$ filtration area, for use with the present wide mouth bottle. Also, the exemplary filter has a minimum 1° per inch draft.

In addition to the iodine bactericide system above, which utilizes an iodine infusion unit, the present system may also be used without said filter/iodine infusion unit, especially in situations where potable, chlorinated tap water is being used to fill the self filling bottle. Allowing the chlorine to remain in the bottle provides bacterial/algae protection for the bottle. Utilizing the neck filter as a post filter in reverse osmosis systems also provides for the same bacterial/algae protection.

The present embodiment may include a venting system as contemplated in FIG. 1 of the invention, as necessary.

Figure 18:
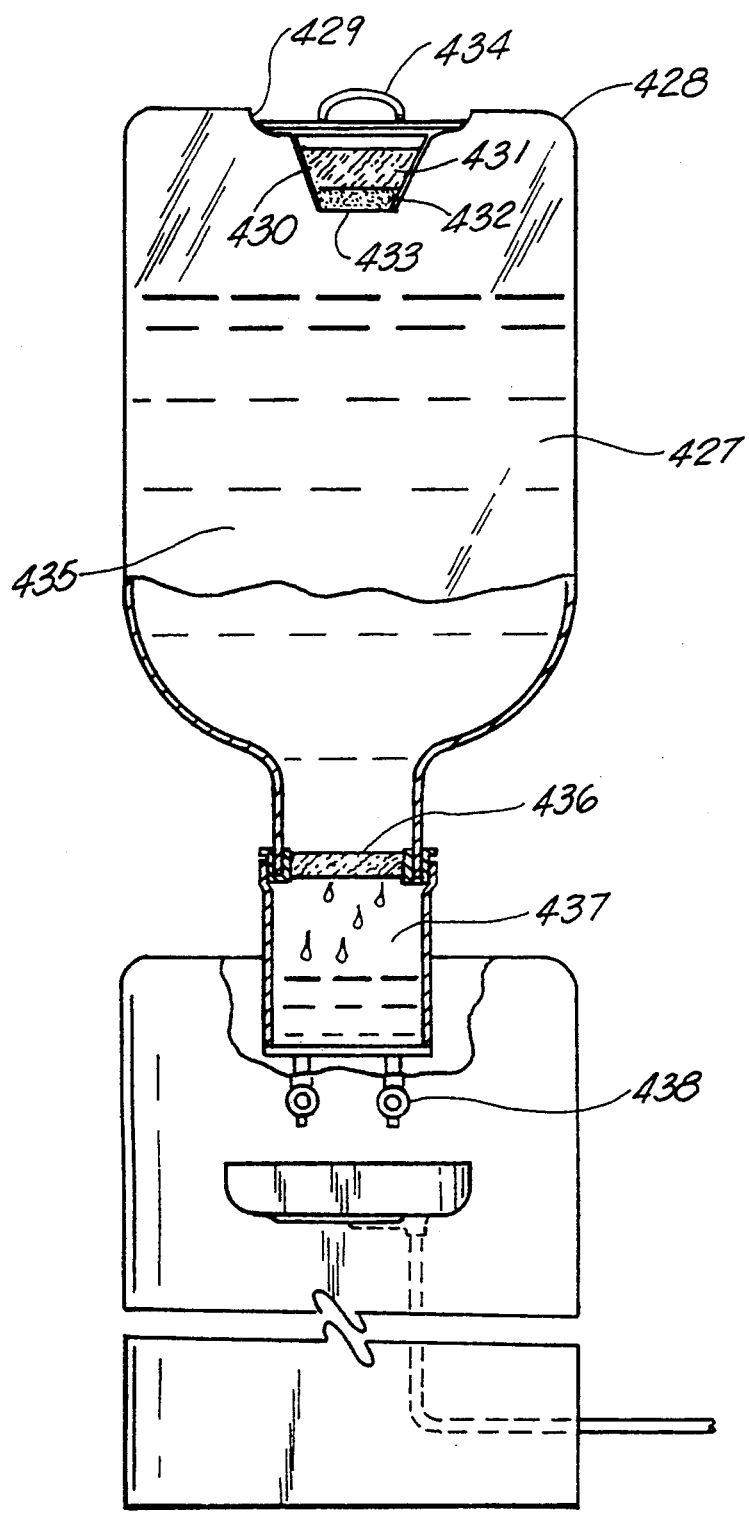
FIG. 18 is a frontal, partially cut-away view of an alternative embodiment of the bottled water disinfectant system of FIG. 15.

FIG. 18 contemplates an alternative embodiment of the disinfection unit of the present embodiment, wherein there is provided the feature of allowing the utilization of the present unit where plumbing or water flow lines are not available.

As shown, the unit includes a water bottle 427 having a catch basin 429 formed in the top portion 428 thereof, wherein there is situated in the bottom of the catch basin a treatment area 430 comprising an upper carbon filter 431 to remove chlorine or the like, and an iodine infusion area 432 comprising iodine infusing resin such as that disclosed supra. Situated under the iodine infusion area is a drip filter screen or the like, to allow the passage of the filtered, iodine infused water 435 into the bottle 427. The catch basin may also include a lid 434 for covering it.

As shown, this alternative embodiment allows for the user to pour water from a container into the catch basin 429 after lifting the lid 434, allowing gravity to flow through the carbon filter 431 and resin infusion area 432, filtering it and infusing the water with resin molecules. The water then passes through the drip filter 433 and into the water bottle 427.

Operation of the system from this point forward is the same as disclosed in the preferred embodiment of the disinfection system supra, except that this system does not need a water level control or vent as depicted in the above embodiments of the invention.

The iodine infused water remains in the bottle 427 until water is dispensed 438 from the water tank, which provides a void in the tank, allowing the passage of water 435 in the bottle through the neck filter 436, wherein the iodine is removed, thereby providing potable water 437.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

In practicing the disinfection units as disclosed above, the user may wish to allow the inlet water be infused with the bactericide media, in this case, iodine, for a period of time in the water bottle prior to dispensing same, for example, 5-10 minutes, in order to allow greater disinfection, prior to filtering the bactericide from the water via the neck filter during dispensing. This may be especially desirable when the bottle is filled after having been empty or substantially emptied during heavy use.

It is also noted that, while the disinfection system of the present system contemplates utilization of iodine/iodide as the bactericide/germicide/viricide, the present invention is not limited to utilization of only iodine/iodide, and may be utilized with similar satisfactory results utilizing other off-the-shelf bactericide/germicide/viricide media. In such an embodiment, the resin infusion media would provide said media, while the neck filter would remove said media.

What is claimed is:

1. A bottled water disinfectant system, for neutralizing biologically contaminated water and rendering it potable, said system including a bottled water cooler having a water cooler having a water tank with an upper open section, further comprising:

a water bottle having an upper, first end and a second, lower end, said lower end including an open neck mounted to the upper portion of said water tank;

an elastomeric seal enveloping a portion of the inner wall and outer wall of said neck end via inner and outer seals, respectively, said outer seal further communicating with the inner wall of a portion of the upper open section of said water tank;

a neck filter situated within the neck of said water bottle, said neck filter further including a housing affixed to the inner walls of said neck in fluid impermeable fashion;

a water inlet system connected to said water bottle, said inlet system including a bactericide unit, said bactericide unit defining a means for removing chlorine and infusing a bactericide into said water prior to reaching said water bottle, said bactericide unit comprising a first sediment and chemical filter, and a second, bactericide media, said bactericide media infusing said bactericide, said bactericide comprising a halogen;

water level control means for controlling the water level in said water bottle;

said neck filter further comprising a filter media means for removing said bactericide from said water as it passes from said bottle to said water tank.

2. The bottled water disinfection system of claim 1, wherein said first sediment and chemical filter comprises a filter having an carbon media, and said bactericide media incorporates an iodine resin, said bactericide comprises iodine, and said neck filter comprises a carbon filter media.

3. The bottled water disinfection system of claim 1, wherein the outer diameter of said bottle neck is only slightly less than the inner diameter of said water tank.

4. A bottled water disinfectant system, for neutralizing biologically contaminated water and rendering it potable, said system including a bottled water cooler having a water tank with an upper open section, further comprising:

a water bottle having a top wall and a second, lower end, said lower end including an open neck mounted to the upper portion of said water tank, said top wall having formed therein a catch basin for receiving poured water;

a water inlet system disposed within said catch basin, said inlet system including a bactericide unit, said bactericide unit defining a means for removing chlorine and infusing a bactericide into water poured into said catch basin, said bactericide unit comprising a first sediment and chemical filter, and a second, bactericide media, said bactericide media infusing said bactericide, said bactericide comprising a halogen, said bactericide unit draining said bactericide infused water into said water bottle;

an elastomeric seal enveloping a portion of the inner wall and outer wall of said neck end via inner and outer seals, respectively, said outer seal further communicating with the inner wall of a portion of the upper open section of said water tank;

a neck filter situated within the neck of said water bottle, said neck filter further including a housing affixed to the inner walls of said neck in fluid impermeable fashion;

said neck filter further comprising a filter media means for removing said bactericide from said water as it passes from said bottle to said water tank.

5. The bottled water disinfection system of claim 4, wherein said first sediment and chemical filter comprises a filter having a carbon media, and said bactericide media incorporates an iodine resin, said bactericide comprises iodine, and said neck filter comprises a carbon filter media.

6. The bottled water disinfection system of claim 4, wherein the outer diameter of said bottle neck is only slightly less than the inner diameter of said water tank.

7. The bottle water disinfection system of claim 4, wherein there is further included a lid for covering said catch basin.

* * * * *